J. BONNER.
LINK JEWELRY.
APPLICATION FILED FEB. 9, 1916.
1,207,844.
Patented Dec. 12, 1916.
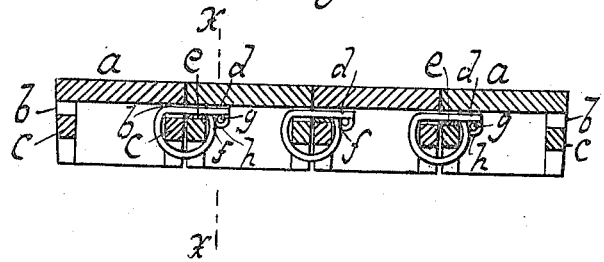
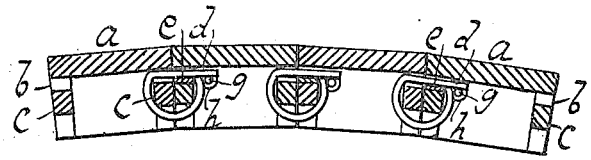
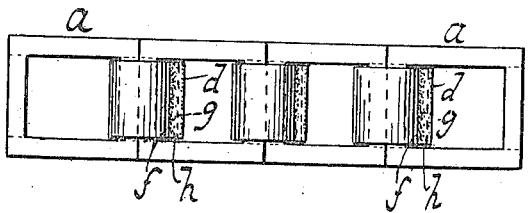
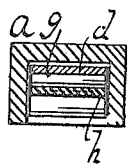
Witness:
William Miller
Inventor
Julius Bonner
By his Attorneys

UNITED STATES PATENT OFFICE.

JULIUS BONNER, OF BROOKLYN, NEW YORK.

LINK JEWELRY.

1,207,844. Specification of Letters Patent. Patented Dec. 12, 1916.

Application filed February 9, 1916. Serial No. 77,114.

*To all whom it may concern:*

Be it known that I, JULIUS BONNER, a citizen of the United States, residing at Brooklyn, county of Kings, and State of New York, have invented new and useful Improvements in Link Jewelry, of which the following is a specification.

This invention relates to an article of jewelry such as a bracelet which is essentially constructed of a series of links provided with rigid coupling devices so that the article can be flexed without injury, accidental fracture or breakage to the coupling joints. The bracelet is built up of a plurality of links, each link having a bar for coaction with a coupling plate looped about the bars of two oppositely positioned links.

The main object of the invention is to provide means for reinforcing the joints between the meeting portions of the coupling plate, and means for firmly uniting the meeting joints by soldering the reinforcing device to the plate. The solder in this construction flows about the reinforcing device which serves as a barrier to prevent the solder from forcing itself onto the inner portion of the coupling plate. In other words this method of soldering the meeting joints adds to the flexion of the links, avoids fracture of the same by obviating leakage of the solder to the joints between the links and produces a practicably unbreakable link connection.

Heretofore the solder was poured between the meeting portions of the coupling plate and some of the solder would run into the joints between the links thus preventing oscillation of the links. Sometimes the end of the coupling plate would not evenly butt against the other end of the plate, hence the solder would run to the opposite link binding it with the plate to the link.

The object of the present invention is to firmly anchor the coupling plate to the bar of a link at its terminals where the most strain is given, so that it can stand any excessive force without danger of breakage or loosening of the union joint.

The novel features of the invention are more fully described in the following specification and claims and illustrated in the accompanying drawing, in which:—

Figure 1 represents a vertical section of a series of links embodying this invention. Fig. 2 is a similar view showing the links flexed. Fig. 3 is an inverted plan view of Fig. 1. Fig. 4 is a vertical transverse section along the line $x$ $x$ of the same.

In this drawing is shown a portion of a bracelet consisting of a series of links $a$, each link being provided with a pair of slots $b$ located at adjacent portions of the link and adapted to form a pair of bars $c$ each bar projecting across the end to the rim of the link. When connected together the bar of one link is arranged opposite the bar of the next link.

A coupling plate is adapted to connect two oppositely located bars by inserting an end $d$ of the plate through the slot of one of the links, then fastening it to the bar by solder as shown at $e$, the next link is positioned alongside of the former link, the plate inserted through its slot and formed about both bars. The end $d$ of the plate projects outward forming angular meeting portions with the other end $f$ of the plate. A pin $g$ is arranged to cover the joints of said meeting portions. The pin is placed on the projecting portion of the plate and is as long as the width of the said plate. The pin is united to the plate by means of solder $h$ which is made to flow about the pin into the angular crevice to securely unite the pin to the curved and flat surface of the plate. This method of soldering the reinforcing pin to the plate gives several points of contact to the periphery of the pin with the plate, while the solder flowing about the pin will entirely cover it and adhere to the curved and flat surface of the coupling plate.

It will be understood that when the links are flexed the most strain is at the union of the coupling plate with the bars. The opposite bar can freely move a predetermined distance in the loop of the coupling plate. The solder being located at the point of junction of the plate will not interfere with the oscillation or flexion of the links.

In this device the bar of a link is securely fulcrumed to the coupling plate, while the adjacent bar of said link can vibrate relative to the succeeding coupling plate so that the links will have a certain movement from a straight to a curvilinear figure. Coupling plate connections of the kind described can be applied to any link jewelry for example lavallières, chains and similar articles.

I claim:—

1. In an article of jewelry the combination with a pair of links, of a coupling member with meeting portions connecting the links, reinforcing means including a composition arranged at the meeting portions for uniting the coupling.

2. In an article of jewelry the combination with a pair of links each having a bar, of a coupling member with meeting portions connecting the bars, and a reinforcing member including a metallic composition disposed at the meeting portions for uniting the coupling.

3. In an article of jewelry the combination with a pair of links each having a bar, of a coupling member with meeting portions extending about the bars, and a reinforcing member including a fusible metallic composition disposed at the meeting portions for uniting the coupling.

4. In an article of jewelry the combination with a pair of links each having a bar, of a coupling member with meeting portions looped about the bars, a reinforcing member including a fusible metallic composition disposed at the meeting portions for uniting the coupling.

5. In an article of jewelry the combination with a pair of links each having a slot and bar, of a coupling member having meeting portions passing through two oppositely located slots and looped about the bars, the coupling having a projecting end, and a reinforcing member including a fusible metallic composition disposed on the projecting end at the meeting portions for uniting the coupling.

6. In an article of jewelry the combination with a pair of links each having a slot and bar, of a coupling member having meeting portions passing through two oppositely located slots and looped about the bars, the coupling having a projecting end secured to a bar, a reinforcing pin including a fusible metallic composition disposed on the projecting end at the meeting portions for uniting the coupling.

In testimony whereof I have hereunto set my hand in the presence of two subscribing witnesses.

JULIUS BONNER.

Witnesses:
WM. E. WARLAND,
CHRISTIAN H. ALMSTAEDT.

Copies of this patent may be obtained for five cents each, by addressing the "Commissioner of Patents, Washington, D. C."